United States Patent [19]

Vallino et al.

[11] Patent Number: 5,681,920
[45] Date of Patent: Oct. 28, 1997

[54] PROCESS FOR PRODUCTION OF A POLYSUCCINIMIDE AND DERIVATIVES THEREOF

[75] Inventors: Barney Vallino, Naperville; Daniel A. Batzel, Skokie, both of Ill.

[73] Assignee: Donlar Corporation, Bedford Park, Ill.

[21] Appl. No.: 267,445

[22] Filed: Jun. 28, 1994

[51] Int. Cl.$^6$ .................................................. C08G 69/10
[52] U.S. Cl. ........................ 528/328; 528/363; 528/392; 525/418; 525/419; 525/420; 525/539
[58] Field of Search ......................... 528/363, 328, 528/392; 525/418, 419, 420, 539

[56] References Cited

U.S. PATENT DOCUMENTS

| | | | |
|---|---|---|---|
| 3,728,797 | 4/1973 | Worden, Sr. et al. | 34/32 |
| 4,839,461 | 6/1989 | Boehmke | 528/363 |
| 5,219,952 | 6/1993 | Koskan et al. | 525/419 |
| 5,221,733 | 6/1993 | Koskan et al. | 528/328 |
| 5,286,799 | 2/1994 | Harrison et al. | 525/285 |
| 5,288,783 | 2/1994 | Wood | 525/418 |
| 5,292,858 | 3/1994 | Wood | 528/345 |
| 5,296,578 | 3/1994 | Koskan et al. | 528/363 |
| 5,315,010 | 5/1994 | Koskan et al. | 548/520 |
| 5,319,030 | 6/1994 | Harrison et al. | 525/285 |
| 5,319,145 | 6/1994 | Paik et al. | 528/328 |
| 5,371,180 | 12/1994 | Groth et al. | 528/363 |
| 5,373,088 | 12/1994 | Koskan et al. | 528/363 |
| 5,380,817 | 1/1995 | Paik et al. | 528/328 |
| 5,391,764 | 2/1995 | Koskan et al. | 548/520 |
| 5,424,391 | 6/1995 | Paik et al. | 528/328 |
| 5,491,212 | 2/1996 | Paik et al. | 528/328 |

FOREIGN PATENT DOCUMENTS 0 593 187 A1  4/1994  European Pat. Off. .

Primary Examiner—James J. Seidleck
Assistant Examiner—P. Hampton-Hightower
Attorney, Agent, or Firm—Olson & Hierl, Ltd.

[57] ABSTRACT

Polysuccinimide is produced by thermal polymerization of a precursor or a reactant admixture that includes an unsaturated compound in a plate-type reactor at temperatures sufficient to initiate polymerization and to form a brittle solid. The so-obtained polysuccinimide can be hydrolyzed to polyaspartic acid or to a polyaspartic acid salt, if desired. The precursor can be a monomer or a mixture of reactants that form polymerizable intermediates.

29 Claims, 11 Drawing Sheets

PROCESS FOR PRODUCTION OF A POLYSUCCINIMIDE AND DERIVATIVES THEREOF

FIELD OF THE INVENTION

This invention relates to the production of a polysuccinimide and derivatives thereof. More particularly, this invention relates to the production of a polysuccinimide or a derivative thereof by thermal polymerization of precursor monomers in a efficient manner.

BACKGROUND OF THE INVENTION

Methods for the preparation of polysuccinimide by the thermal polymerization of ammonia salts of maleic acid are known in the art. Illustrative of such methods are those described in U.S. Pat. No. 4,839,461 to Boehmke, U.S. Pat. No. 5,296,578 to Koskan et al. and U.S. Pat. No. 5,288,783 to Wood. However, as the thermal polymerization of ammonium maleate compounds proceeds, the mass of reactants and reaction products becomes extremely viscous and virtually impossible to process. The result is an incomplete polymerization.

The present invention overcomes the aforementioned difficulties and provides a manufacturing process during the course of which stirring is not needed.

SUMMARY OF THE INVENTION

Polysuccinimide in good yields is produced by thermal polymerization of an unsaturated organic polysuccinimide precursor in an externally heated plate-type reactor at temperatures sufficient to initiate polymerization and to form a brittle solid, preferably in the range of about 140° C. to about 350° C., more preferably about 185° C. to about 300° C. The precursor preferably is an ammonium salt of maleic acid. However, other precursors such as an ammonium salt of fumaric acid, and the like, can be utilized as well.

The thermal polymerization can be carried out as a continuous, semi-continuous, or batch process, with or without a catalyst present.

DETAILED DESCRIPTION OF PREFERRED EMBODIMENTS

The polysuccinimide precursor suitable for the purposes of the present invention is an unsaturated organic acid or salt that is either commercially available, or one that can be prepared, e.g. by reacting maleic anhydride or maleic acid with ammonia or ammonium hydroxide. A variety of such processes for preparation are known in the art. However, the thermal polymerization of such precursors to polysuccinimide has met with limited commercial success due to the formation of highly viscous intermediates that are very difficult to handle and that preclude an effective release of thermal polymerization byproducts. The present process, on the other hand, minimizes such processing difficulties and provides for easy recovery of the thermal polymerization product, i.e., polysuccinimide, in good yields by using a plate-type reactor.

Specifically, the polysuccinimide precursor, prepared in any convenient manner, is passed through a hot reaction zone as a relatively thin layer on a plate, usually in intimate contact with a solid heat transfer surface, not exceeding about 2 inches (about 5 centimeters) in thickness, and is maintained in the reaction zone at a temperature sufficient to initiate polymerization and to form a brittle solid, preferably in the range of about 140° C. to about 350° C. for a time period in the range of about 15 minutes to about 5 hours, preferably for about 30 minutes to about 120 minutes.

In the absence of a thermal polymerization catalyst, the more preferred temperature range is about 185° C. to about 300° C., most preferably about 250° C., for about 60 minutes.

The present thermal polymerization process is particularly well suited for use with precursors that are ammonium salts of maleic acid, malic acid, fumaric acid, maleamic acid, iraconic acid, citraconic acid, and mixtures thereof. Illustrative such salts are monoammonium maleate, diammonium maleate, monoammonium fumarate, diammonium fumarate, monoammonium maleamate, and derivatives of the foregoing.

Additionally, the thermally polymerized polysuccinimide can be derived from a mixture of reactants that form one or more intermediates which, in turn, can be polymerized to polysuccinimide. Illustrative such mixtures are maleic anhydride and ammonium carbonate, citraconic anhydride and ammonium carbonate, iraconic anhydride and ammonium carbonate, maleic anhydride and asparagine, citraconic anhydride and asparagine, iraconic anhydride and asparagine, maleic anhydride and ammonium maleamate, citraconic anhydride and ammonium maleamate, iraconic anhydride and ammonium maleamate, maleic anhydride and monoammonium aspartate, citraconic anhydride and monoammonium aspartate, itaconic anhydride and monoammonium aspartate, maleic acid and ammonium carbonate, and ammonium carbonate, maleic acid and asparagine, citraconic acid and asparagine, itaconic acid and asparagine, maleic acid and ammonium maleamate, citraconic acid and ammonium maleamate, itaconic acid and ammonium maleamate, maleic acid and monoammonium aspartate, citraconic acid and monoammonium aspartate, iraconic acid and monoammonium aspartate, malic acid and ammonium carbonate, malic acid and asparagine, malic acid and ammonium maleamate, malic acid and monoammonium aspartate, fumaric acid and ammonium carbonate, fumaric acid and asparagine, fumaric acid and ammonium maleamate, fumaric acid and monoammonium aspartate, and the like.

The hot reaction zone can be a furnace or oven into which the precursor is introduced as a relatively thin layer of a reaction mass on a plate-type reactor, e.g., on trays, on a continuously moving conveyor belt (stainless steel or temperature-resistant composite), or in any other convenient manner, and heated sufficiently for polymerization to take place. The furnace atmosphere can be inert, if desired, or can be enriched with ammonia. Process pressure in the hot reaction zone can be atmospheric or sub-atmospheric.

Upon reaching polymerization temperatures, the reaction mass begins to foam, releasing polymerization by-products such as water. The thermal polymerization product obtained in the reaction zone is a brittle mass that can be readily recovered and comminuted to a desired particle size for use, or for hydrolysis to polyaspartic acid or a salt thereof in a known manner.

The present process provides the required heat input to complete the polymerization to polysuccinimide quickly and in relatively inexpensive equipment. Full advantage is taken of the fact that the precursors of polysuccinimide are solids that can be easily spread in a relatively thin layer on a heat transfer surface either as a powder, slurry or paste and then heated to form a melt of reactants. The moisture content is not critical for this purpose. This thin layer provides sufficient surface for the transfer of the required heat without requiring mixing. In addition, as the polymerization-reaction is completed, the thin layer of reactants becomes a expanded brittle porous mass that is easily removed from the heat transfer surface and ground into a free flowing powder that can be easily fed to a hydrolysis reactor. As the temperature of the reactant and mixture rises, the reactants become a melt. Thus, no effort needs to be made to agitate the reactants because it is not necessary to do so for heat transfer purposes. Sufficient heat transfer is provided by heating from both below by the heat transfer surface and from above the reacting mass itself by radiant heat, conduction and/or convection. This can be most easily and economically achieved by using a continuous gas fired oven such as is used in baking or curing.

In an embodiment of the present process, the polysuccinimide precursor is spread on a continuous belt or the like at the inlet to the oven, then enters the reaction zone which is heated by gas firing or a similar expedient. The belt speed is adjusted so that the polymerization reaction is completed while in the reaction zone. The obtained polysuccinimide product then enters a cooling zone where air or a water spray can be used to reduce the product temperature and to aid in the release of the product from the belt.

Figure 1:
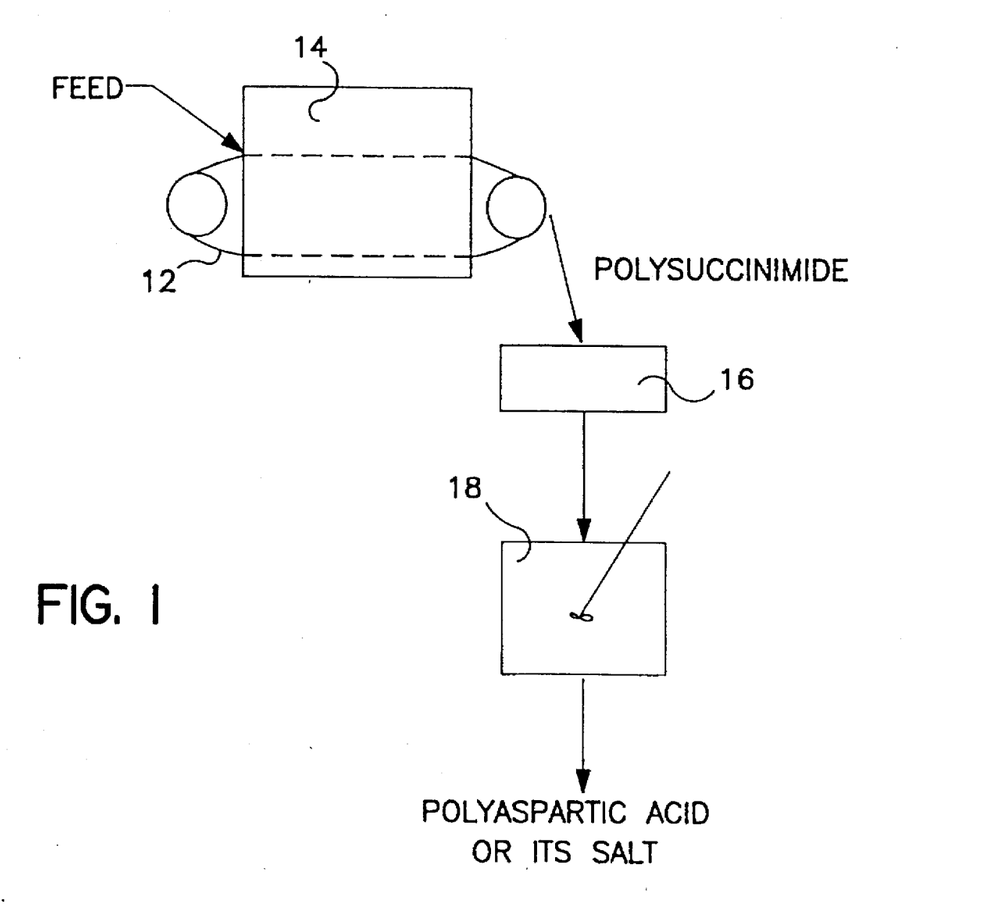
FIG. 1 is a schematic process flow diagram showing the overall process of this invention.

As shown in FIG. 1, the polysuccinimide precursor feed is deposited on a conveyor 12 such as a stainless steel conveyor belt and passed through furnace 14 that provides a hot reaction zone for the feed. Produced polysuccinimide is removed from conveyor 12 and comminuted to a desired particle size in grinder 16. If conversion to polyaspartic acid or a salt of polyaspartic acid is desired, the comminuted polysuccinimide is hydrolyzed in hydrolyzer 18.

In addition to the continuous embodiment, the present process can also be practiced by feeding the precursor to trays on a continuous chain which trays are then are moved through a hot oven. Cooling of the produced polysuccinimide can be accomplished by spraying water or air onto the trays at the downstream end of the reactor oven or furnace. The trays are upended as they exit the oven and return to the upstream part of the oven on the underside of the chain.

Additionally, the present process can be practiced in a batch oven. In this particular configuration, the precursor is spread to the desired thickness described hereinabove on trays. These trays are then placed on a rack and wheeled into a hot oven. The oven is shut down upon completion of the polymerization, the obtained polymer cooled, removed from the trays, and ground to a desired particle size.

The resulting polysuccinimide can be base hydrolyzed to polyaspartic acid, or to a polyaspartic acid salt preferably using an alkali metal hydroxide, e.g., sodium hydroxide, and the like. While not a simple reaction, the base hydrolysis generally follows an Arrhenius profile where the optimum temperature for the hydrolysis is about 70° C.

To hydrolyze, a suspension of polysuccinimide in water is made with vigorous mixing in order to wet the solids. Tank car caustic is the preferred hydrolysis base and is added to the suspension at a controlled rate. The hydrolysis reaction is monitored so that the pH value of the suspension averages about 9.5 and the temperature does not exceed about 80° C. The amount of base used for the hydrolysis is at least stoichiometric with respect to polysuccinimide present. Solution strengths from about 5 to about 50 weight percent are obtained with a preferred range of about 40 to about 45 weight percent solids.

The present invention is further illustrated by the examples that follow.

EXAMPLE 1

Synthesis of Dry Monoammonium Maleate. Isolation by Precipitation.

Maleic anhydride briquettes (400.64 g; 4.09 mol) were crushed into small pieces and placed in a reaction vessel (2 L). Water (600 ml) was added to the vessel to give a suspension. The vessel was immersed in an ice-water bath. The suspension was stirred with a mechanical stirrer until the temperature of the suspension was about 13° C. Next, aqueous ammonia (29.8% w/w; 256.22 g; 4.48 mol ammonia) was added to the stirred reactants dropwise over a period of 2.5 h. The temperature of the reaction contents was maintained at around 5° to 15° C. After the ammonia addition was complete, the reactants were warmed to room temperature. The resulting suspension was filtered and the recovered solid was allowed to air dry. The acidic filtrate (approx. pH 4) was concentrated in vacuo and the resulting suspension was filtered. The obtained solid was air dried. The filtrate volume was 150 ml. The two air dried solids were combined and dried for an additional time (40° C.; 3 h) to give colorless crystals (352.8 g). The product, monoammonium maleate, was characterized by TLC (1:5 MeOH:EtOAc; Polygram $SiO_2$; Rf 0.09) and infrared spectroscopy. The product, when dissolved in water, gave an acidic litmus test. A Karl Fisher titration showed that product contained 0.1% w/w water. A sodium hydroxide titration indicated that the product contained 96% monoammonium maleate and 4% diammonium maleate.

EXAMPLE 2

Isolation of Dry Monoammonium Maleate by Spray Drying.

A concentrated filtrate containing monoammonium maleate (152 g) similar to the one described in Example 1 was diluted with water to give a final volume of 500 ml (0.304 g/ml). The solution was dried in a commercial spray drier (Buchi Mini, atomizer flow setting 800, aspirator setting wide open) to give colorless powders that were confirmed as monoammonium maleate. Settings and recoveries are shown in Table 1, below.

TABLE 1

| Spray Drying Conditions and Results for Example 2 | | | | | | |
|---|---|---|---|---|---|---|
| Pump Setting | Inlet Temp (°C.) | Outlet Temp (°C.) | Amount Soln Added (ml) | Addition Rate (ml/min) | Wt. Product (g) | Recovery (%) |
| 8 | 130 | 80 | 60 | 8.6 | 3.83 | 21 |
| 8 | 180 | 120 | 60 | 8.6 | 1.48 | 8.1 |
| 8 | 205 | 139 | 60 | — | 1.03 | 5.6 |
| 8 | 96 | 57 | 60 | 10 | 7.43 | 41 |
| 4 | 99 | 71 | 60 | 6.7 | 7.46 | 41 |

EXAMPLE 3

Synthesis of Wet Monoammonium Maleate. Isolation by Precipitation.

Deionized water (21.8 kg) was added to a chilled 20-gallon jacketed reactor. Next, crushed maleic anhydride powder (21.8 kg; 222.28 mol) was added to the reactor. The resulting suspension was stirred with a mechanical stirrer and was cooled to 15° C. Next, aqueous ammonia (30% w/w; 14.08 kg; 244.89 mol) was slowly added to the stirred reaction contents by means of a dip tube over a one hour period. The temperature of the reactor contents was maintained below 30° C. during this time. After the ammonia addition was completed, the resulting suspension was filtered. The wet solid was stored in a drum. Three additional experiments were conducted using the above procedure and the solids were combined with the solid obtained from the first experiment. The wet solids from all four experiments were allowed to air dry for two days to give a moist colorless product (56.3 kg). The product was identified as monoammonium maleate by TLC (1:5 MeOH:EtOAc; Polygram $SiO_2$; Rf 0.09) and was found to contain 10% water by weight by Karl Fisher titration. A sodium hydroxide titration of the obtained product indicated that the product contained 93.4% monoammonium maleate and 6.6% diammonium maleate.

EXAMPLE 4

Synthesis of Diammonium Maleate.

Maleic anhydride (158.94 g, 1.62 mol) and water (150 ml) were combined in a 1-liter flask and stirred to give a suspension. An ice bath was used to cool the suspension to 10° C. Next aqueous ammonia (29.7% w/w; 205.0 g; 3.57 mol) was added to the mixture over a one hour period and the resulting solution was brought to room temperature. The solution was rotary evaporated (−80 KPa vacuum, 70° C.) to give a moist solid that was washed with two portions (300 ml each) of acetone and air dried to give a very slightly pink colored solid (210.48 g). The product, when dissolved in water, gave a neutral pH toward litmus. The product contained 1.8% water by weight by Karl Fisher titration.

EXAMPLES 5-25

Synthesis of Polysuccinimide by Layer Polymerization.

General Procedure: A Kenmore convection oven with a heating coil at the bottom of the oven was preheated to a nominal predetermined setpoint temperature. During this time three aluminum pans [28.5×10.5×2 cm (l×w×h)] were filled with the ammonium maleate salts described in the previous examples. In some of the experiments, the temperature of the inside bottom surface of the pans containing the salts was measured using a specialized surface thermocouple probe (Omega Scientific, model CO1, type K). The three pans were placed next to each other on the same rack in the oven. The height of the rack above the heating coil was 13 cm. The temperature of the oven was measured with a thermocouple probe (Type K) positioned above (~3 cm) the surface of the contents in each pan. There was no significant variation in the oven temperature above each of the three pans. The pans were kept in the oven for a predetermined reaction time. After this time had been reached, the three pans were quickly removed from the oven, cooled to room temperature, and the products were crushed to a fine powder and weighed.

The products were analyzed for molecular weight by size exclusion chromatography. In this procedure the product (0.5 g) was combined with sodium hydroxide solution (1N; 5.2 ml) and stirred to give a solution. A portion of this solution (1.0 g) was combined with potassium phosphate dibasic solution (0.1M, 5.5 g). The resultant admixture was filtered through a 0.45 μm filter (nylon) and subjected to instrumental analysis. The instrumental setup consisted of (1) an HPLC pump (Shimadzu model LC-10AD), (2) a mobile phase (0.05M $KH_2PO_4$ soln.) which carried the analyte (20 μL) at a rate of 0.4 ml/min, (3) two size exclusion chromatography columns (SynChropak GPC 100, GPC 500), and (4) an ultraviolet (220 nm) detector. The instrument was standardized using sodium polyacrylate standards (Polysciences, Inc.) of narrow molecular weight distributions. Weight average (Mw) and number average (Mn) molecular weights were obtained using an algorithm in the data handling system (Hitachi D-2520 GPC integrator).

The conditions and results for each polymerization reaction for Examples 5-25 are shown in Table 2, below.

TABLE 2

Conditions and Results of Polymerization Reactions for Examples 5-25

| Ex. | Starting Mtl. from Example | Weight Loaded (g) | Loading g reactant/ $cm^2$ surface | Nominal Oven Temp (°C.) | Time in Oven (h) | Weight Product (g) | Mw | Mw/Mn | Weight Loss (%) |
|---|---|---|---|---|---|---|---|---|---|
| 5  | 3 | 75.22  | 0.25 | 185 | 0.5 | 53.82  | 871  | 3.0 | 28.4 |
| 6  | 3 | 151.60 | 0.5  | 185 | 0.5 | 121.10 | 576  | 2.2 | 20.1 |
| 7  | 3 | 300.01 | 1.0  | 185 | 0.5 | 265.23 | 366  | 1.7 | 11.6 |
| 8  | 3 | 75.04  | 0.25 | 205 | 0.5 | 49.79  | 1497 | 3.7 | 33.6 |
| 9  | 3 | 150.01 | 0.5  | 205 | 0.5 | 103.22 | 1146 | 3.5 | 31.2 |
| 10 | 3 | 300.04 | 1.0  | 205 | 0.5 | 234.52 | 534  | 2.1 | 21.8 |
| 11 | 3 | 75.15  | 0.25 | 250 | 0.5 | 50.63  | 1967 | 3.3 | 32.6 |
| 12 | 3 | 150.03 | 0.5  | 250 | 0.5 | 98.90  | 1610 | 3.3 | 34.1 |
| 13 | 3 | 300.12 | 1.0  | 250 | 0.5 | 216.17 | 1088 | 3.3 | 28.0 |
| 14 | 3 | 75.31  | 0.25 | 305 | 0.5 | 44.49  | 2059 | 1.9 | 40.9 |
| 15 | 3 | 150.30 | 0.5  | 305 | 0.5 | 88.34  | 2152 | 2.4 | 41.2 |
| 16 | 3 | 300.12 | 1.0  | 305 | 0.5 | 188.13 | 1750 | 3.9 | 37.3 |
| 17 | 3 | 75.12  | 0.25 | 205 | 1.0 | 47.29  | 1694 | 3.7 | 37.0 |
| 18 | 3 | 150.64 | 0.5  | 205 | 1.0 | 96.14  | 1638 | 2.8 | 36.2 |
| 19 | 3 | 300.12 | 1.0  | 205 | 1.0 | 209.08 | 1001 | 3.0 | 30.3 |
| 20 | 3 | 75.03  | 0.25 | 250 | 1.0 | 46.78  | 2039 | 2.8 | 37.7 |
| 21 | 3 | 150.08 | 0.5  | 250 | 1.0 | 93.25  | 2043 | 2.5 | 37.9 |

TABLE 2-continued

Conditions and Results of Polymerization Reactions for Examples 5–25

| Ex. | Starting Mtl. from Example | Weight Loaded (g) | Loading g reactant/ cm² surface | Nominal Oven Temp (°C.) | Time in Oven (h) | Weight Product (g) | Mw | Mw/ Mn | Weight Loss (%) |
|---|---|---|---|---|---|---|---|---|---|
| 22 | 3 | 300.22 | 1.0 | 250 | 1.0 | 193.60 | 1863 | 3.6 | 35.5 |
| 23 | 4 | 149.94 | 0.5 | 250 | 0.5 | 97.95 | 1266 | 2.8 | 34.7 |
| 24 | 1 | 150.33 | 0.5 | 250 | 0.5 | 110.93 | 1588 | 4.0 | 26.2 |
| 25 | 3 | 149.98 | 0.5 | 250 | 0.5 | 97.15 | 1618 | 4.1 | 35.2 |

Figure 2:
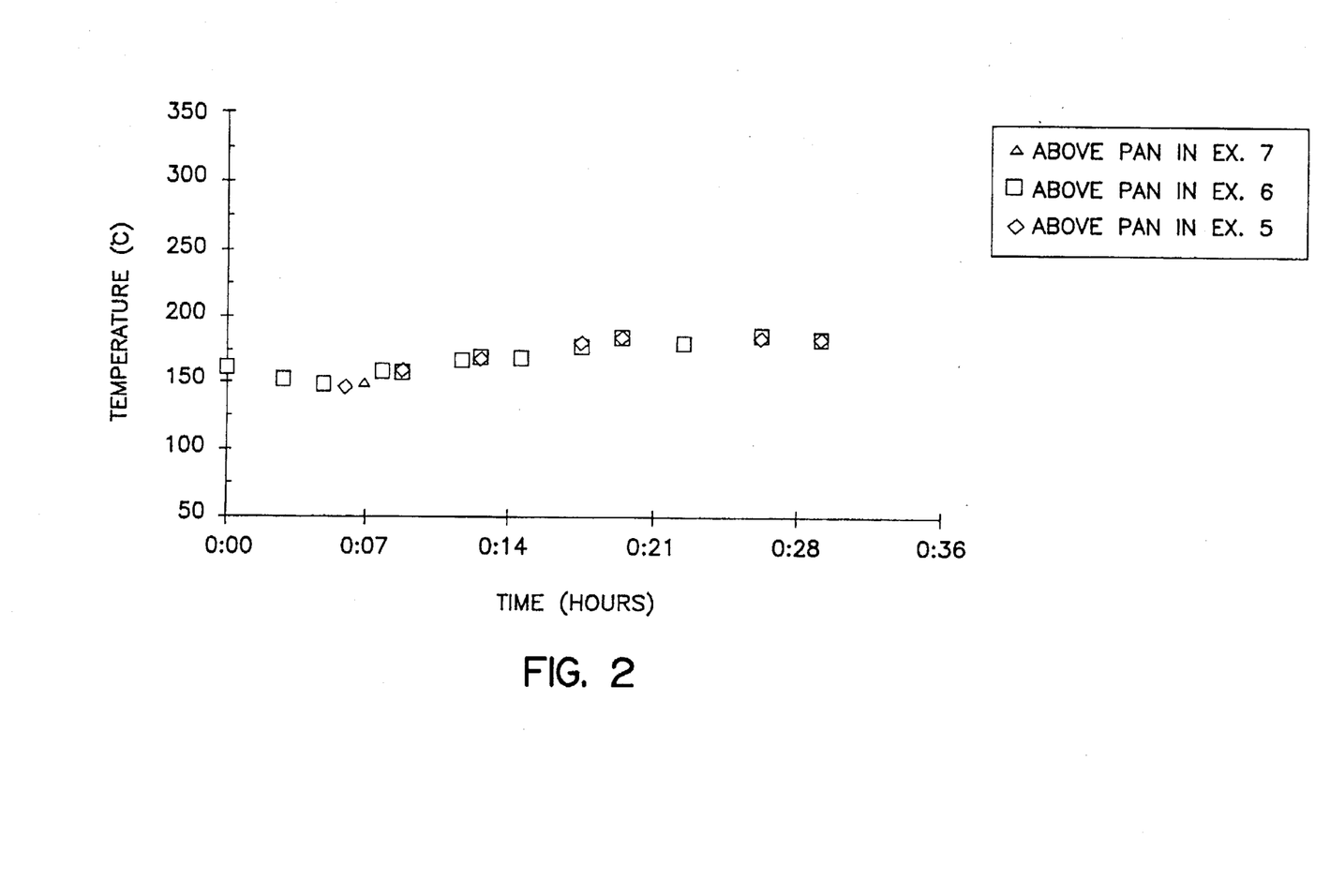
FIGS. 2–11 are heating curves for a group of experiments reported herein and show reactant temperature as a function of elapsed time in a plate-type reactor.
Figure 3:
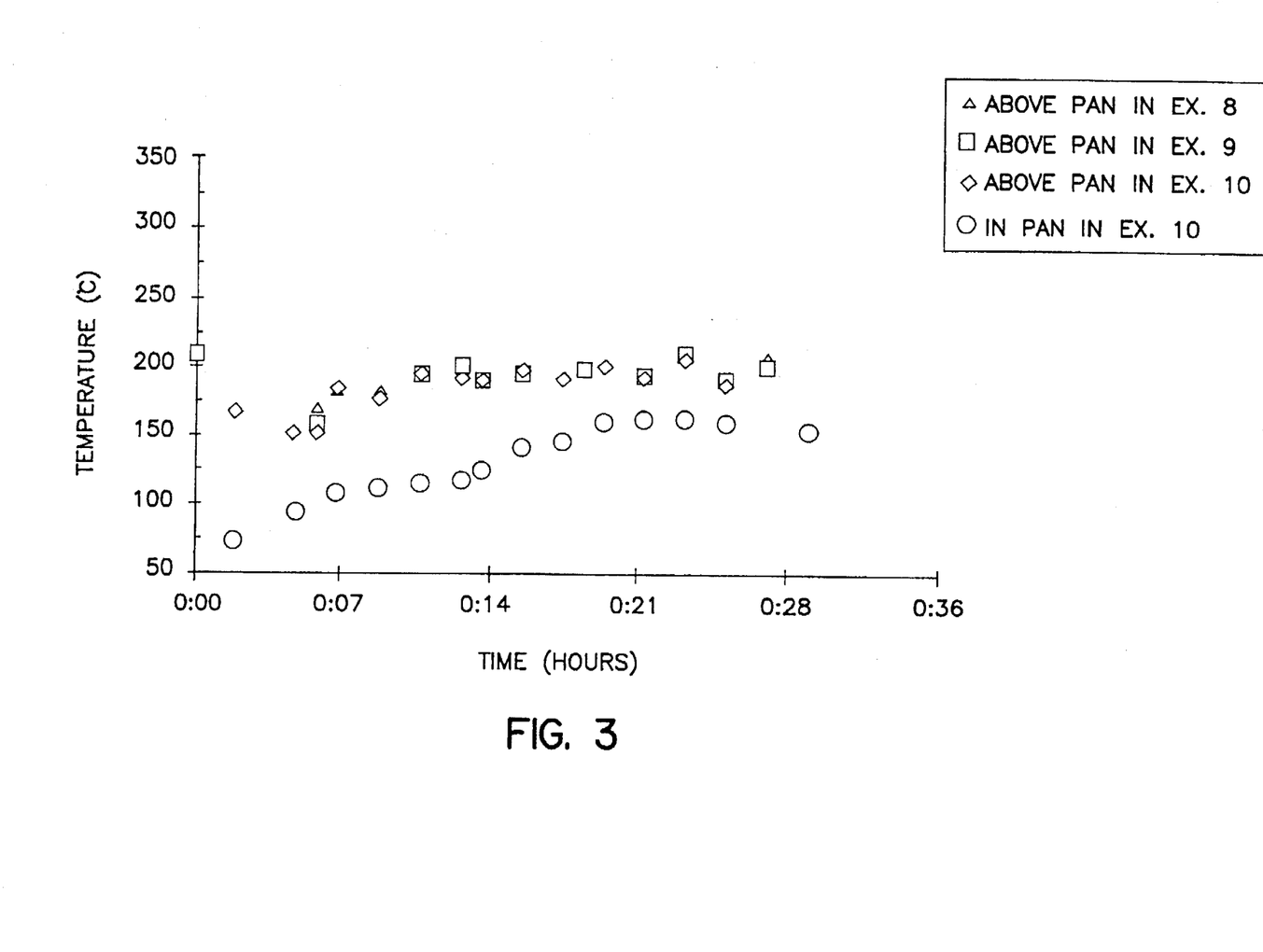
Figure 4:
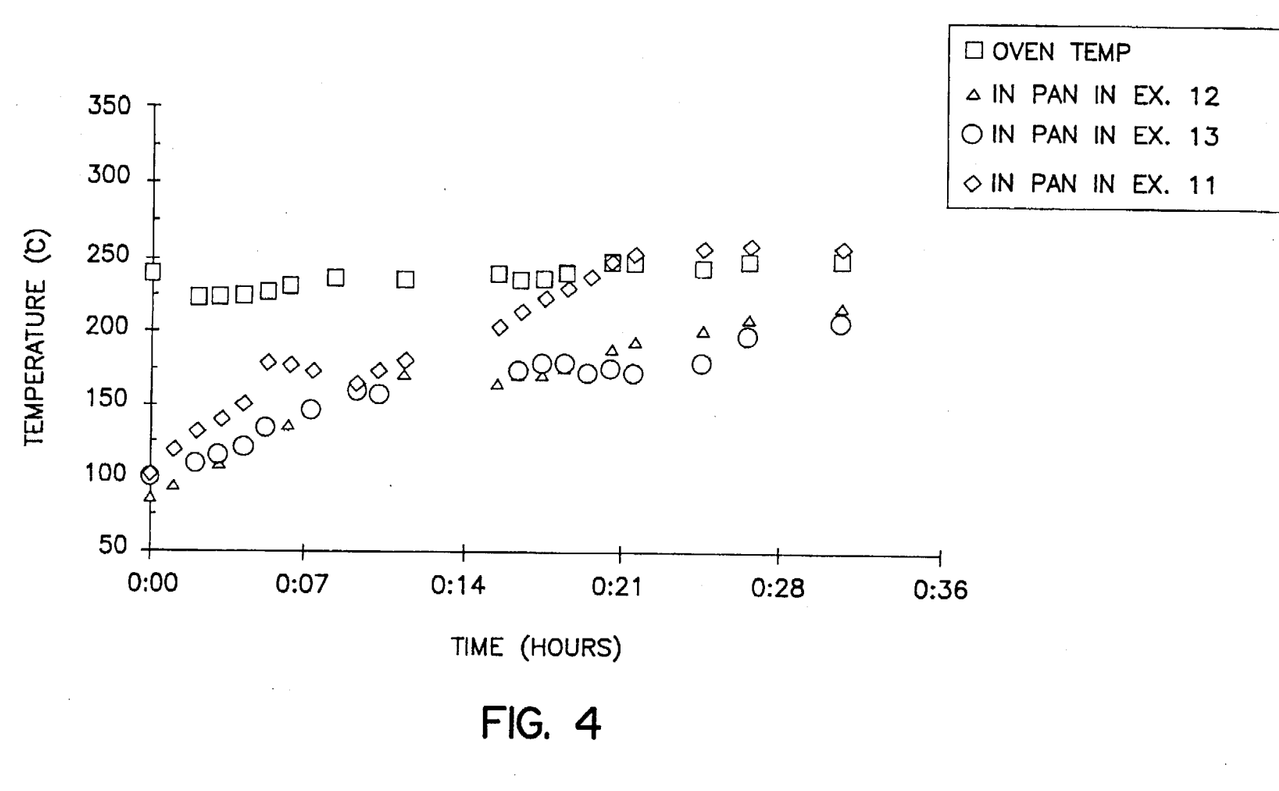
Figure 5:
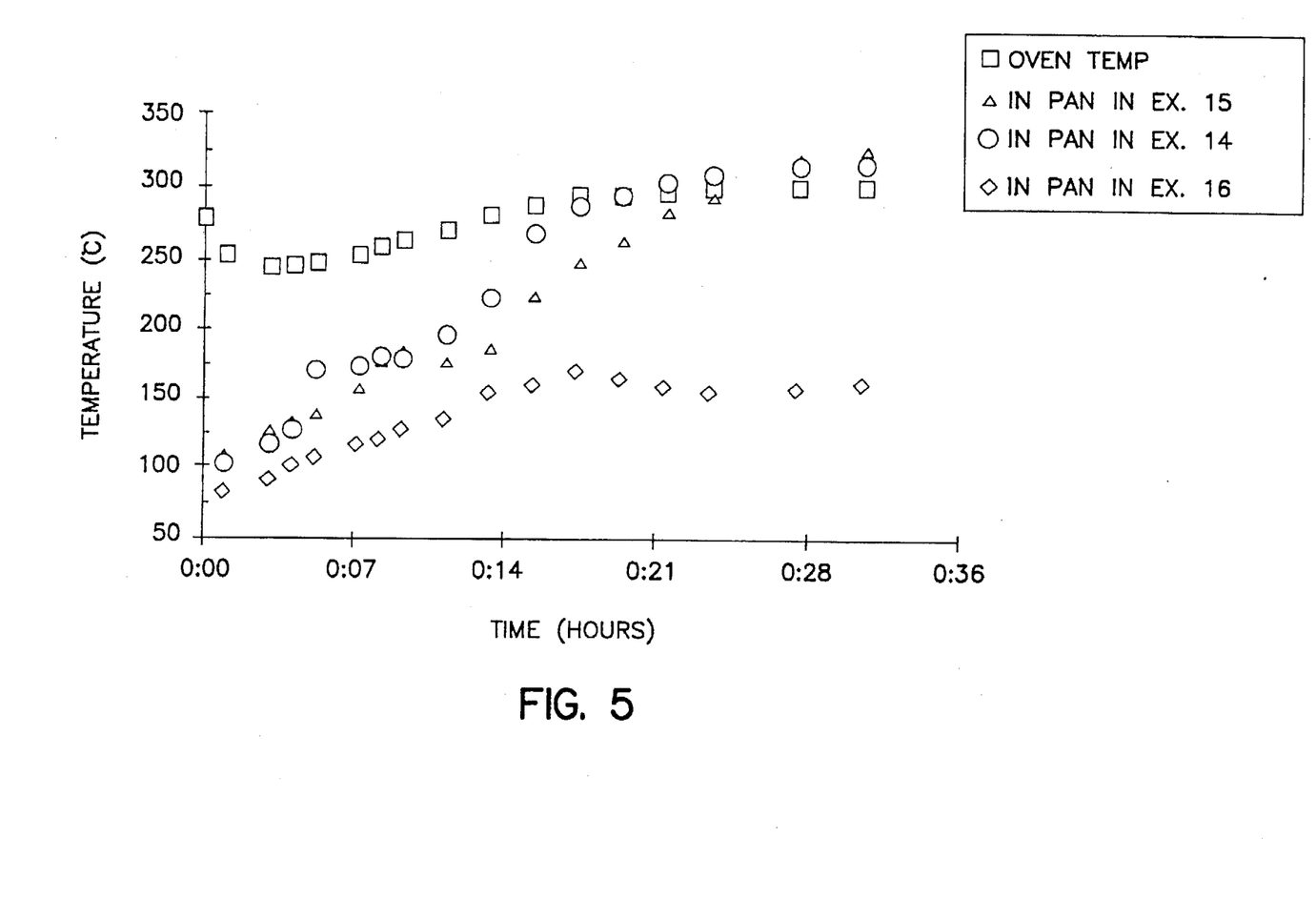
Figure 6:
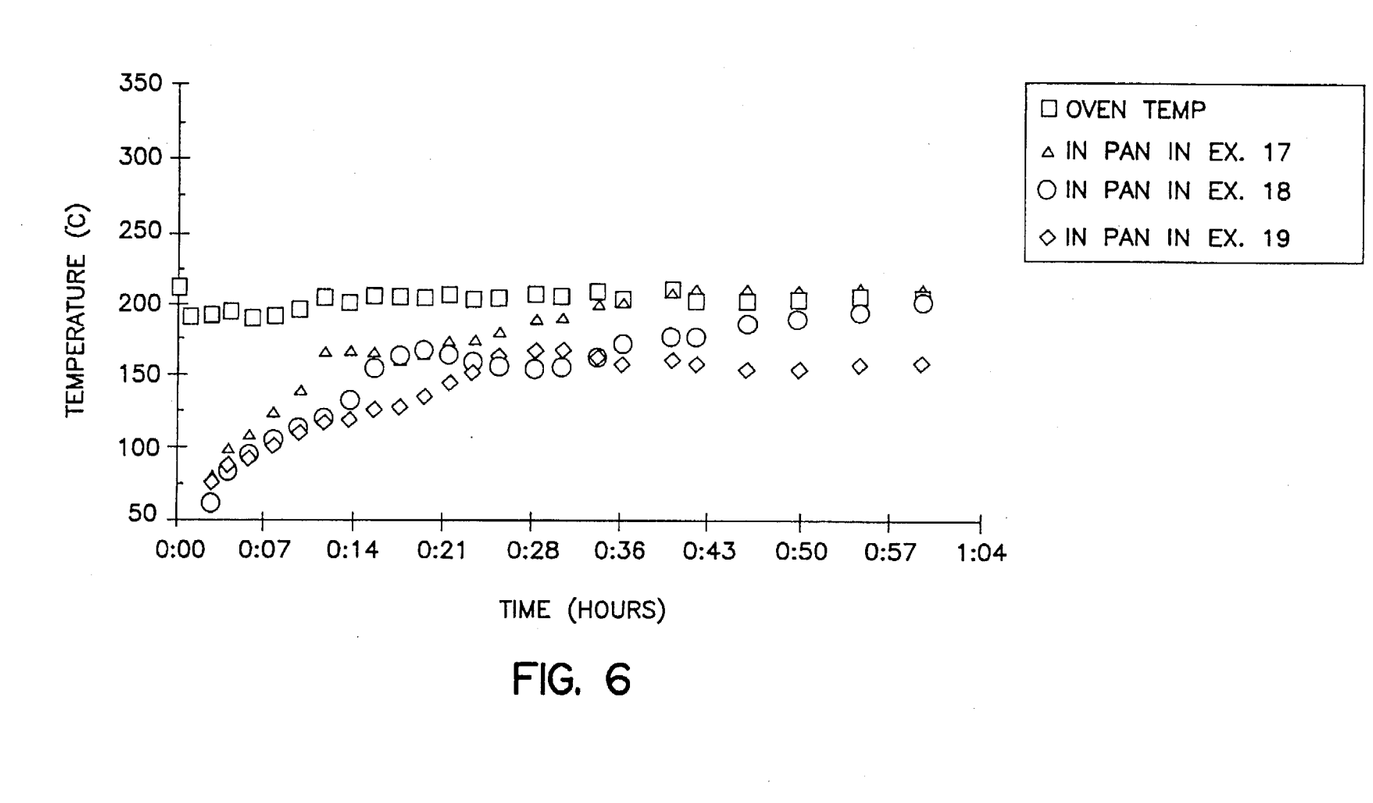
Figure 7:
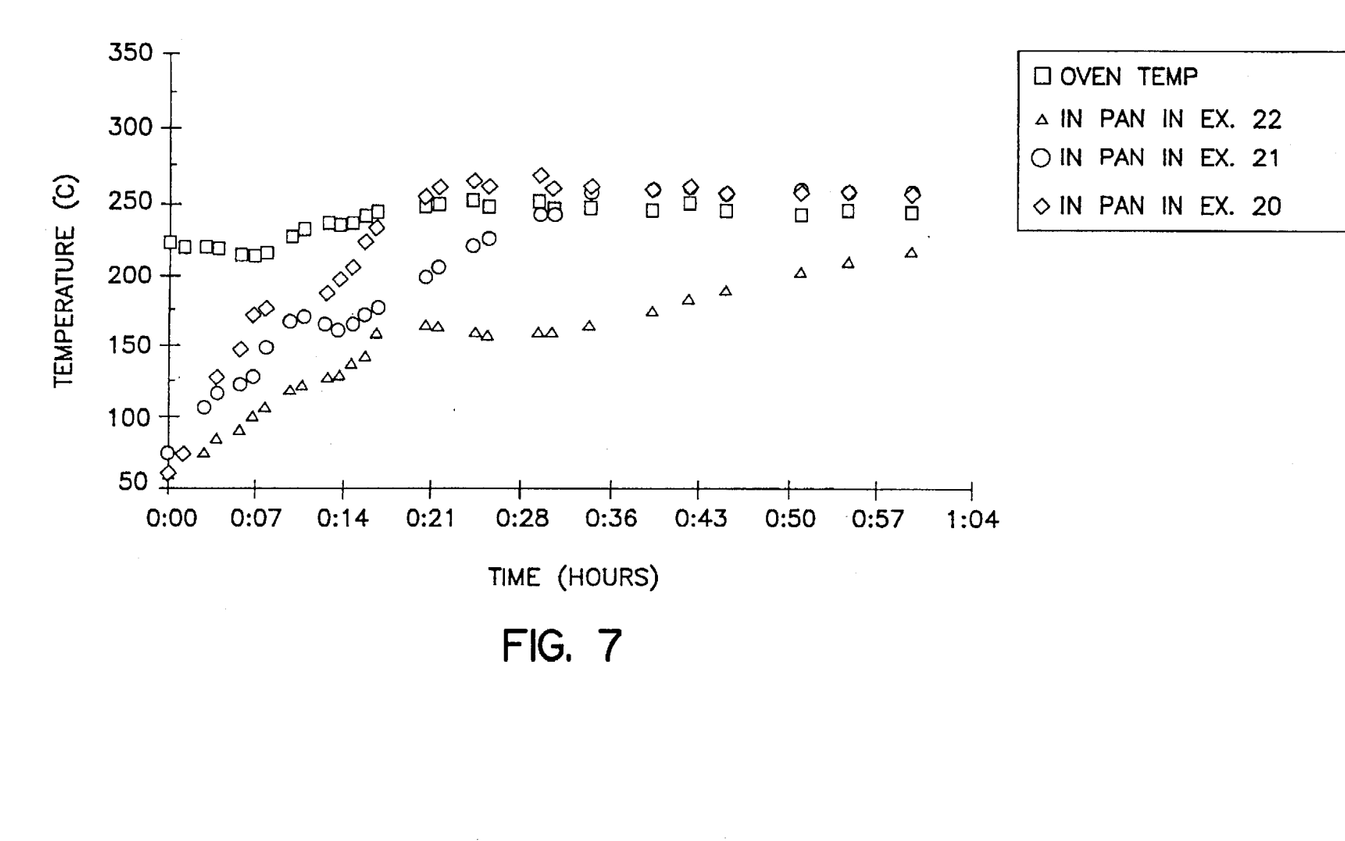
Figure 8:
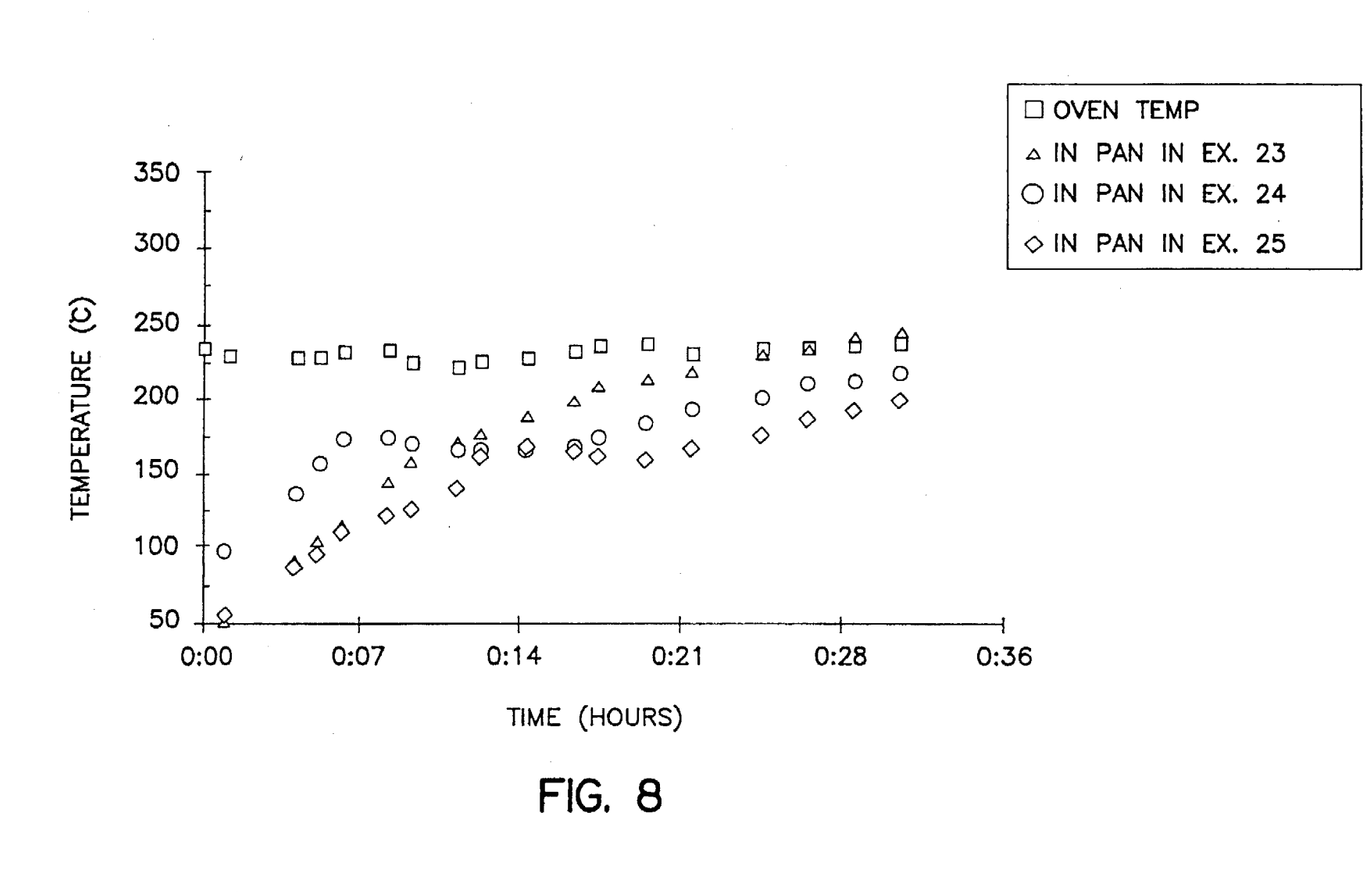

Heating curve and/or oven temperature data for Examples 5–25 are presented in FIGS. 2–8 as follows:

Examples 5–7 FIG. 2
Examples 8–10 FIG. 3
Examples 11–13 FIG. 4
Examples 14–16 FIG. 5
Examples 17–19 FIG. 6
Examples 20–22 FIG. 7
Examples 23–25 FIG. 8

Discussion of Examples 5–25

Examples 5–7

FIG. 2 shows the temperature above the pans containing monoammonium maleate. As can be seen from the data, the temperature was uniform above each of the pans throughout the experiment.

The data from Table 2 clearly shows decreasing Mw with increasing loading. The data also shows decreasing weight loss with increasing loading. The relatively lesser loading facilitates complete conversion to occur within a relatively shorter time period at substantially constant heat transfer.

Examples 8–10

FIG. 3 shows the temperature above the pans in Examples 8–10. The temperatures above each of the three pans are uniform and support the conclusion that the oven provides a uniform heating environment.

FIG. 3 also shows the temperature in the pan corresponding to Example 10. The curve obtained has four distinct portions. The first portion is a region of rapid temperature increase. The second portion of the curve is a region of slower temperature increase. This second region potentially corresponds to the monomer. The third portion f the curve is a region of removal of free waters of association from the starting faster temperature increase. This third region potentially corresponds to the point at which the polymerization reaction begins. The fourth portion of the curve is a region of slower and leveling temperature increase. This potentially corresponds to the point at which waters of imidization are evolving and the completion of the reaction.

The data from Table 2 clearly show a decreasing Mw with increasing loading. The data also show decreasing weight loss with increasing loading. The relative ordering is attributed to faster heat transfer with lower loading.

Examples 11–13

FIG. 4 shows the heating curves for Examples 11–13. As is seen from the data, the sample with the lowest loading (0.25 g/cm², Example 11) reached the four regions of the heating curve more quickly than the samples containing the higher loading levels (Examples 12, 13). Accordingly, from Table 2, the Mw obtained for the product of Example 11 is higher than the Mw's obtained for the products of the other two examples.

Examples 14–16

FIG. 5 clearly shows differences in heating rates of the samples from Examples 14–16. The heating rate decreases with increasing loading and is again attributed to heat transfer differences.

Summary of Examples 5–16

The data for Examples 5–16 (Table 2) clearly show that Mw increases with increasing oven temperature and decreasing loading.

Examples 17–19

FIG. 6 shows the standard four region heating curves for the three loadings. These reactions, conducted for one hour at a nominal oven temperature of 205° C., show increasing Mw with decreasing loading. As discussed before, a similar trend is obtained for Examples 8–10, conducted for 0.5 hour at a nominal oven temperature of 205° C. Differences in the two data sets were that the Mw difference between Examples 17 and 18 was smaller than the Mw difference between Examples 8 and 9. These differences are believed to be due to the longer reaction time.

Examples 20–22

FIG. 7 shows that the final oven temperature was reached for the two lower loadings (Examples 20, 21) but was not reached for the highest loading (Example 22). Differences in the Mw between the products of these examples are much smaller than the differences obtained between Examples 11–13. Again, these differences are probably due to the longer reaction time.

Examples 23–25

FIG. 8 shows the difference between heating curves obtained for the products of dry diammonium maleate (Example 23), dry monoammonium maleate (Example 24), and wet monoammonium maleate (Example 25).

The heating curve for the reaction of diammonium maleate (Example 23) consists of a straight increase in temperature with time. The curve for Example 24, dry monoammonium maleate, is similar to the curve for Example 25, wet monoammonium maleate, in that they both have the previously described four region appearance.

The infrared spectrum of the product of Example 23 confirmed that it was polysuccinimide, however its Mw (1266) was less than that obtained for both monoammonium salts (1588 for Example 24; 1618 for Example 25). Other differences were that the extent of foaming in Example 23 was at least ten times greater than the extent of foaming in the other examples. In fact, the pan used for the reaction had overflowed extensively during Example 23, whereas the contents of the other two examples were contained in the reaction pan. The extra equivalent of ammonia present may have caused this unusual expansion in Example 23.

Comparison of the heating curves for the wet versus dry monoammonium maleate shows that the dry starting material reached the final reaction temperature earlier than the wet starting material. The Mw obtained for both products was nearly the same, indicating that for the reaction conditions and loading employed in these Examples, water content of the starting material is not significant.

EXAMPLES 26–28

Layer Polymerization of Monoammonium Maleate.

The purpose of this experiment was to determine whether low temperature for long reaction times would give high molecular weight polysuccinimide while minimizing thermal decomposition. Results (Table 3 and Table 2, Example 6) indicate that Mw levels out at two hours reaction time. The Mw's obtained are still lower than experiments at higher temperatures for shorter times (Cf. Example 21). The method used was the same as that in Examples 5–25, above.

EXAMPLE 32

Results from Polymerization of Monoammonium Maleate in a Stirred Reactor.

Figure 11:
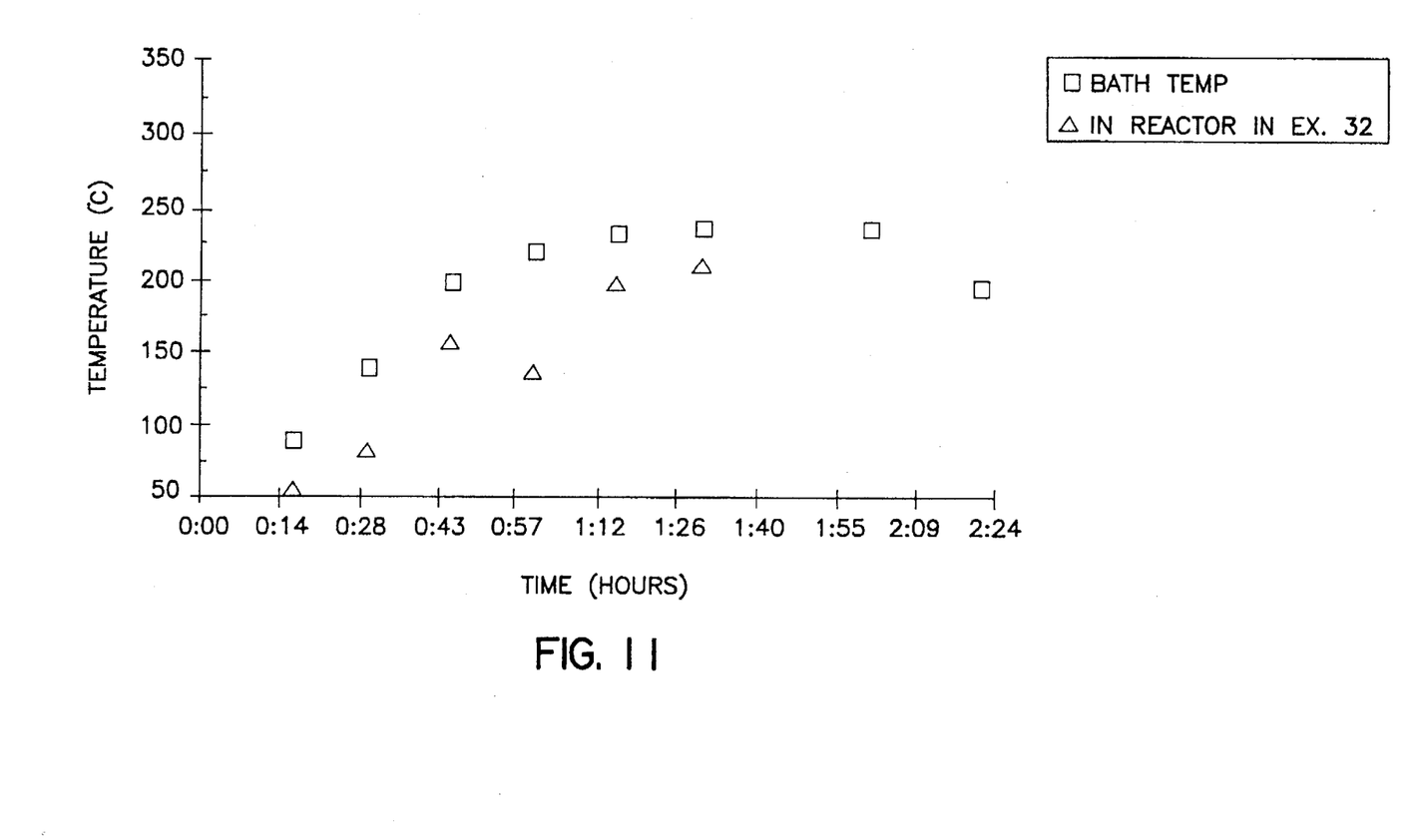

Monoammonium maleate (200.0 g), prepared using the same method as in Example 3 but containing 9.2% (w/w) water, was loaded into a stainless steel reactor (1200 ml volume) equipped with a mechanical stirrer. The powdered starting material was stirred in the reactor. The reactor was placed in an oil bath at room temperature. The temperature of the oil bath was increased to 240° C. over approximately a one hour period and kept at this temperature for one hour and then cooled to 200° C. for 20 minutes and then removed from the oil bath and cooled to room temperature. The temperature inside the reactor was also recorded. The heating curves and data are shown in FIG. 11.

After about 0.75 to 1 hour into the heating step described above (at an internal temperature of about 160° C.), the

TABLE 3

Conditions and Results of Polymerization Reactions for Examples 26, 27, 28

| Ex. | Starting Mtl. from Example | Weight Loaded (g) | Loading g reactant/cm$^2$ surface | Nominal Oven Temp (°C.) | Time in Oven (h) | Weight Product (g) | Mw | Mw/Mn | Weight Loss (%) |
|---|---|---|---|---|---|---|---|---|---|
| 26 | 3[1] | 150.7 | 0.5 | 185 | 1.0 | 92.80 | 1276 | 2.6 | 38 |
| 27 | 3[1] | 150.7 | 0.5 | 185 | 4.0 | 91.41 | 1463 | 3.0 | 39 |
| 28 | 3[1] | 150.0 | 0.5 | 185 | 2.0 | 90.23 | 1481 | 3.2 | 40 |

[1]H$_2$O content 13 wt.-%.

Figure 9:
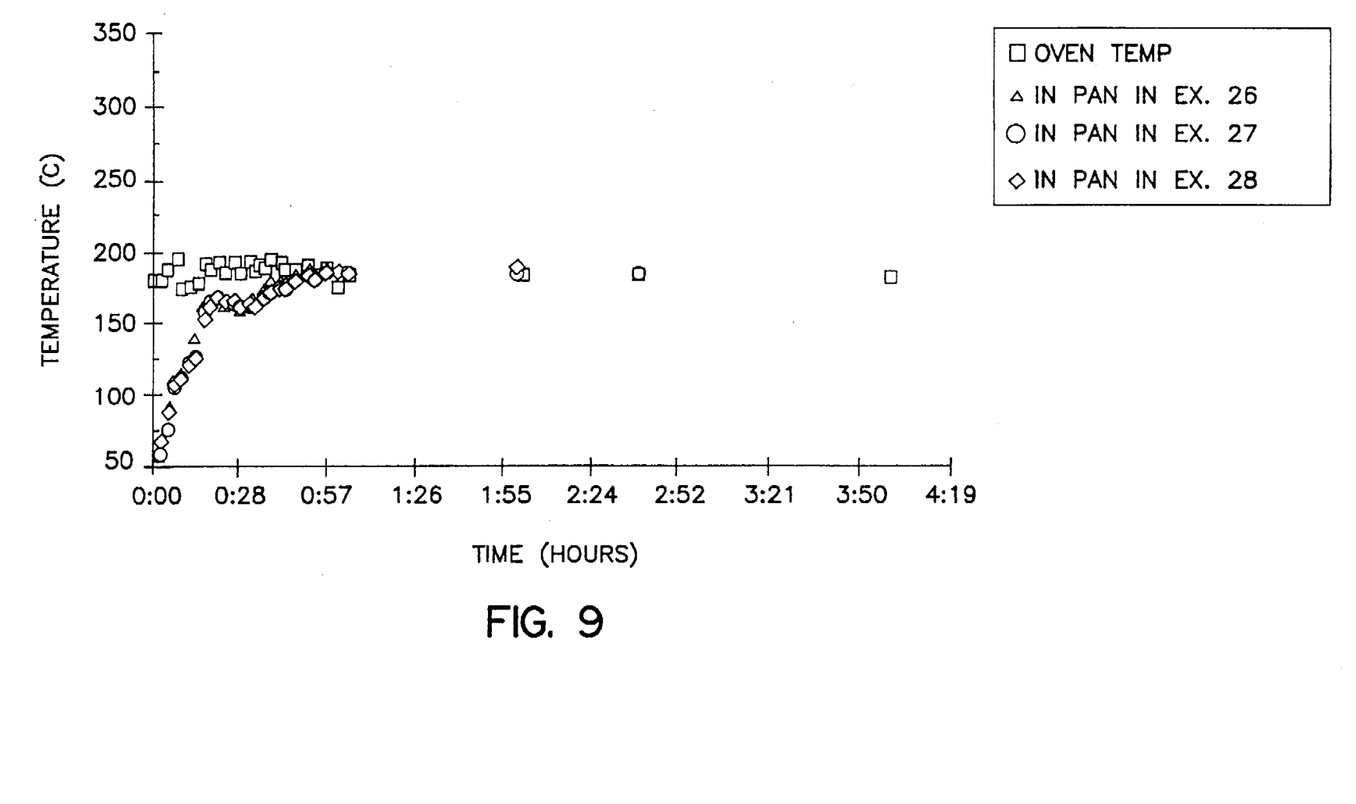

The heating curves for these Examples are presented in FIG. 9.

EXAMPLES 29–31

Polymerization of Monoammonium Maleate; High Loading.

The product of Example 3 was used as the starting material for these examples. The water content in the starting material was 8.5% (w/w). The general method used for Examples 29 and 30 was the same as that used for Examples 5–25. The method used for Example 31 was the same except that in Example 31 a circular glass dish having the dimensions (12 cm dia×6 cm h) was used in place of the rectangular aluminum pan.

stirrer came to a complete stop. The viscous reactor contents subsequently began to foam. The viscous foam overflowed the top lid of the reactor. At about 1.25 h into the heating, the contents stopped foaming and formed a sticky mass. After the heating was complete, the reactor contents were an non-homogeneous mixture that occupied the entire volume of the reactor. The mixture contained regions that were sticky glasses and other regions that were brittle foam-like solids. The contents were crushed to a powder in a mortar, weighed (132.5 g) and analyzed by size exclusion chromatography as described in Examples 5–25: Mw 1158; Mn 402; Mw/Mn 2.9.

This example demonstrates that it is not practical to carry out the thermal polymerization in a stirred reactor.

TABLE 4

Conditions and Results of Polymerization Reactions for Examples 29, 30, 31

| Ex. | Starting Mtl. from Example | Weight Loaded (g) | Loading g reactant/cm$^2$ surface | Nominal Oven Temp (°C.) | Time in Oven (h) | Weight Product (g) | Mw | Mw/Mn | Weight Loss (%) |
|---|---|---|---|---|---|---|---|---|---|
| 29 | 3[1] | 499.31 | 1.7 | 305 | 0.60 | 346.18 | 387 | 2.6 | 30.7 |
| 30 | 3[1] | 501.33 | 1.7 | 305 | 0.97 | 318.32 | 1112 | 2.9 | 36.5 |
| 31 | 3[1] | 206.18 | 1.8 | 305 | 0.60 | 129.98 | 1604 | 2.9 | 37.0 |

[1]H$_2$O content 8.5 wt.-%.

Figure 10:
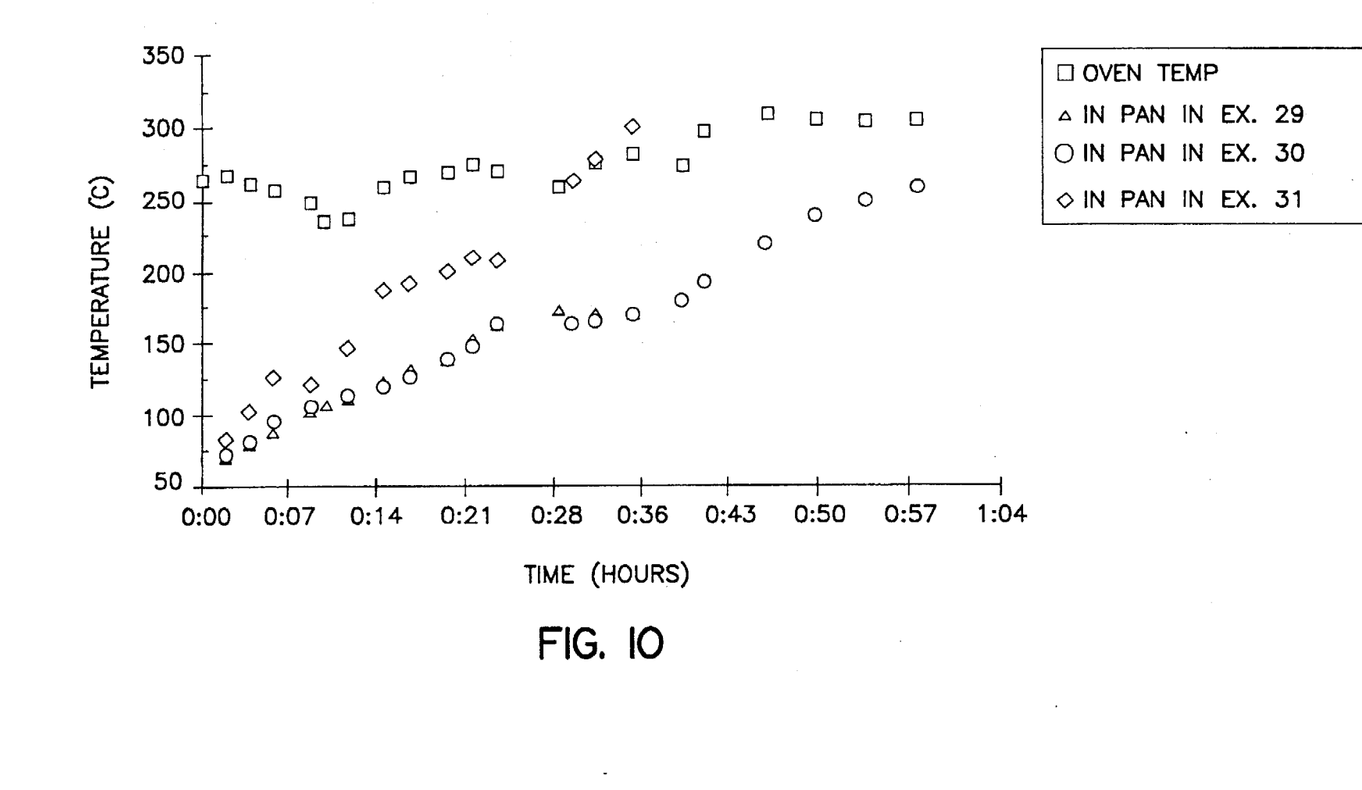

The heating curves for these examples are shown in FIG. 10. The rate of temperature increase for Example 31 was faster than the rates for Examples 29 and 30. Accordingly, the Mw and percent weight loss for Example 31 was greater than those for Example 29. Reasons for this are not clear, but the observed results could be due to differences in packing volume of the starting materials in the two different shaped containers, thermal conductivity differences between the two container materials, or to differences in container wall height leading to differences in mixing of the reaction intermediates and products.

The foregoing examples and the accompanying discussion are intended as illustrative and are not to be taken as limiting of the present invention. Still other variations within the spirit and scope of the present invention are possible and will readily present themselves to those skilled in the art.

We claim:

1. A process for the production of polysuccinimide which comprises the steps of (a) depositing a thermally polymerizable polysuccinimide precursor as a layer onto a plate reactor and in intimate contact with a solid heat transfer surface, wherein said precursor comprises an ammonium salt of an acid which is a member of the group consisting of maleic acid, malic acid, fumaric acid, maleamic acid, itaconic acid, citraconic acid, and mixtures thereof, (b) passing the deposited precursor through a hot reaction zone at a temperature sufficient to initiate polymerization and maintaining said layer in said reaction zone for a time period sufficient to form a brittle solid, and (c) thereafter recovering thermally polymerized polysuccinimide from said reactor.

2. The process in accordance with claim 1 wherein said precursor is a mixture of maleic anhydride and ammonium maleamate.

3. The process in accordance with claim 1 wherein said precursor is a mixture of citraconic anhydride and ammonium maleamate.

4. The process in accordance with claim 1 wherein said precursor is a mixture of itaconic anhydride and ammonium maleamate.

5. The process in accordance with claim 1 wherein said precursor is a mixture of maleic anhydride and monoammonium aspartate.

6. The process in accordance with claim 1 wherein said precursor is a mixture of citraconic anhydride and monoammonium aspartate.

7. The process in accordance with claim 1 wherein said precursor is a mixture of itaconic anhydride and monoammonium aspartate.

8. The process in accordance with claim 1 wherein said precursor is a mixture of maleic acid and ammonium maleamate.

9. The process in accordance with claim 1 wherein said precursor is a mixture of citraconic acid and ammonium maleamate.

10. The process in accordance with claim 1 wherein said precursor is a mixture of itaconic acid and ammonium maleamate.

11. A process for the production of polysuccinimide which comprises the steps of (a) depositing a thermally polymerizable polysuccinimide precursor as a layer onto a plate reactor and in intimate contact with a solid heat transfer surface, wherein said precursor is a mixture of maleic acid and monoammonium asparate, (b) passing the deposited precursor through a hot reaction zone at a temperature sufficient to initiate polymerization and maintaining said layer in said reaction zone for a time period sufficient to form a brittle solid, and (c) thereafter recovering thermally polymerized polysuccinimide from said reactor.

12. A process for the production of polysuccinimide which comprises the steps of (a) depositing a thermally polymerizable polysuccinimide precursor as a layer onto a plate reactor and in intimate contact with a solid heat transfer surface, wherein said precursor is a mixture of itaconic acid and monoammonium aspartate, (b) passing the deposited precursor through a hot reaction zone at a temperature sufficient to initiate polymerization and maintaining said layer in said reaction zone for a time period sufficient to form a brittle solid, and (c) thereafter recovering thermally polymerized polysuccinimide from said reactor.

13. A process for the production of polysuccinimide which comprises the steps of (a) depositing a thermally polymerizable polysuccinimide precursor as a layer onto a plate reactor and in intimate contact with a solid heat transfer surface, wherein said precursor is a mixture of itaconic acid and monoammonium aspartate, (b) passing the deposited precursor through a hot reaction zone at a temperature sufficient to initiate polymerization and maintaining said layer in said reaction zone for a time period sufficient to form a brittle solid, and (c) thereafter recovering thermally polymerized polysuccinimide from said reactor.

14. A process for the production of polysuccinimide which comprises the steps of (a) depositing a thermally polymerizable polysuccinimide precursor as a layer onto a plate reactor and in intimate contact with a solid heat trasfer surface, wherein said precursor is a mixture of malic acid and aspargine, (b) passing the deposited precursor through a hot reaction zone at a temperature sufficient to initiate polymerization and maintaining said contact of said layer without mixing while in said reaction zone for a time period sufficient to form a brittle solid, and (c) therafter recovering thermally polymerized polysuccinimide from said reactor.

15. The process in accordance with claim 1 wherein said precursor is a mixture of malic acid and ammonium maleamate.

16. A process for the production of polysuccinimide which comprises the steps of (a) depositing a thermally polymerizable polysuccinimide precursor as a layer onto a plate reactor and in intimate contact with a solid heat transfer surface, wherein said precursor is a mixture of malic acid and monoammonium aspartate, (b) passing the deposited precursor through a hot reaction zone at a temperature sufficient to initiate polymerization and maintaining said layer in said reaction zone for a time period sufficient to form a brittle solid, and (c) thereafter recovering thermally polymerized polysuccinimide from said reactor.

17. The process in accordance with claim 1 wherein said precursor is a mixture of fumaric acid and ammonium maleamate.

18. A process for the production of polysuccinimide which comprises the steps of (a) depositing a thermally polymerizable polysuccinimide precursor as a layer onto a plate reactor and in intimate contact with a solid heat transfer surface, wherein said precursor is a mixture of fumaric acid and monoammonium aspartate, (b) passing the deposited precursor through a hot reaction zone at a temperature sufficient to initiate polymerization and maintaining said layer in said reaction zone for a time period sufficient to form a brittle solid, and (c) thereafter recovering thermally polymerized polysuccinimide from said reactor.

19. The process in accordance with claim 1 wherein the reaction zone is maintained at a temperature in the range of about 185° C. to about 300° C.

20. The process in accordance with claim 1 wherein the reaction zone is at a temperature of about 250° C., and wherein said layer is in the reaction zone for a time period of about 60 minutes.

21. The process in accordance with claim 1 wherein the precursor is an ammonium salt of maleic acid.

22. The process in accordance with claim 1 wherein the ammonium salt of maleic acid is monoammonium maleate.

23. The process in accordance with claim 1 wherein the ammonium salt of maleic acid is diammonium maleate.

24. The process in accordance with claim 1 wherein the precursor is monoammonium maleamate.

25. The process in accordance with claim 1 wherein the precursor is an ammonium salt of fumaric acid.

26. The process in accordance with claim 1 wherein the layer is in intimate contact with a solid heat transfer surface while in said reaction zone.

27. The process in accordance with claim 1 wherein said layer is present in the reaction zone for a time period in the range of about 30 minutes to about 120 minutes.

28. The process in accordance with claim 1 further including the step of hydrolyzing the produced polysuccinimide.

29. The process in accordance with claim 1 wherein said polysuccinimide is base hydrolyzed to a polyaspartic acid salt.

* * * * *